United States Patent [19]

Heil

[11] Patent Number: 5,724,246
[45] Date of Patent: Mar. 3, 1998

[54] ARRANGEMENT FOR THE CONTROLLED NOTCHING AND CUTTING OF FRAMING COMPONENTS

[76] Inventor: Edwin Dean Heil, 2828 River Bend, Kingwood, Tex. 77339

[21] Appl. No.: 587,960

[22] Filed: Jan. 17, 1996

[51] Int. Cl.⁶ .......................... G06F 19/00; G05B 19/402
[52] U.S. Cl. ............... 364/474.09; 83/72; 83/917; 364/474.02; 364/468.21
[58] Field of Search ............... 364/474.09, 474.01, 364/474.02, 474.24, 468.19, 468.21; 83/917, 406, 406.1, 875–878, 37, 38, 51, 72–76.9; 234/46–48, 49, 50; 144/382, 383, 421, 422

[56] References Cited

U.S. PATENT DOCUMENTS

| | | | |
|---|---|---|---|
| 5,195,412 | 3/1993 | Flemming et al. | 83/917 X |
| 5,349,730 | 9/1994 | Aivoerson et al. | 83/76.8 X |
| 5,381,342 | 1/1995 | Noe | 83/72 X |
| 5,574,651 | 11/1996 | McKeegan et al. | 364/474.02 |

Primary Examiner—Joseph Ruggiero
Attorney, Agent, or Firm—Leonard Bloom

[57] ABSTRACT

An arrangement for the controlled notching and placement of components, such as studs, wall plates, shelves and furniture. The arrangement includes a support for supporting the components. A notcher is carried by the support for selectively notching the components bought into contact therewith. A traveling pusher is movably carried by the support for horizontal movement thereof in a first direction towards the notcher and in a second opposite direction away from the notcher. The components are marked with an appropriate code for subsequent assembly. A cutoff saw is carried by the support, such that the notcher is positioned between the cutoff saw and the traveling pusher. A computer coordinates and controls the operation and movement of the traveling pusher, the notcher and the cutoff saw, the marking and the ejecting of the components.

28 Claims, 11 Drawing Sheets

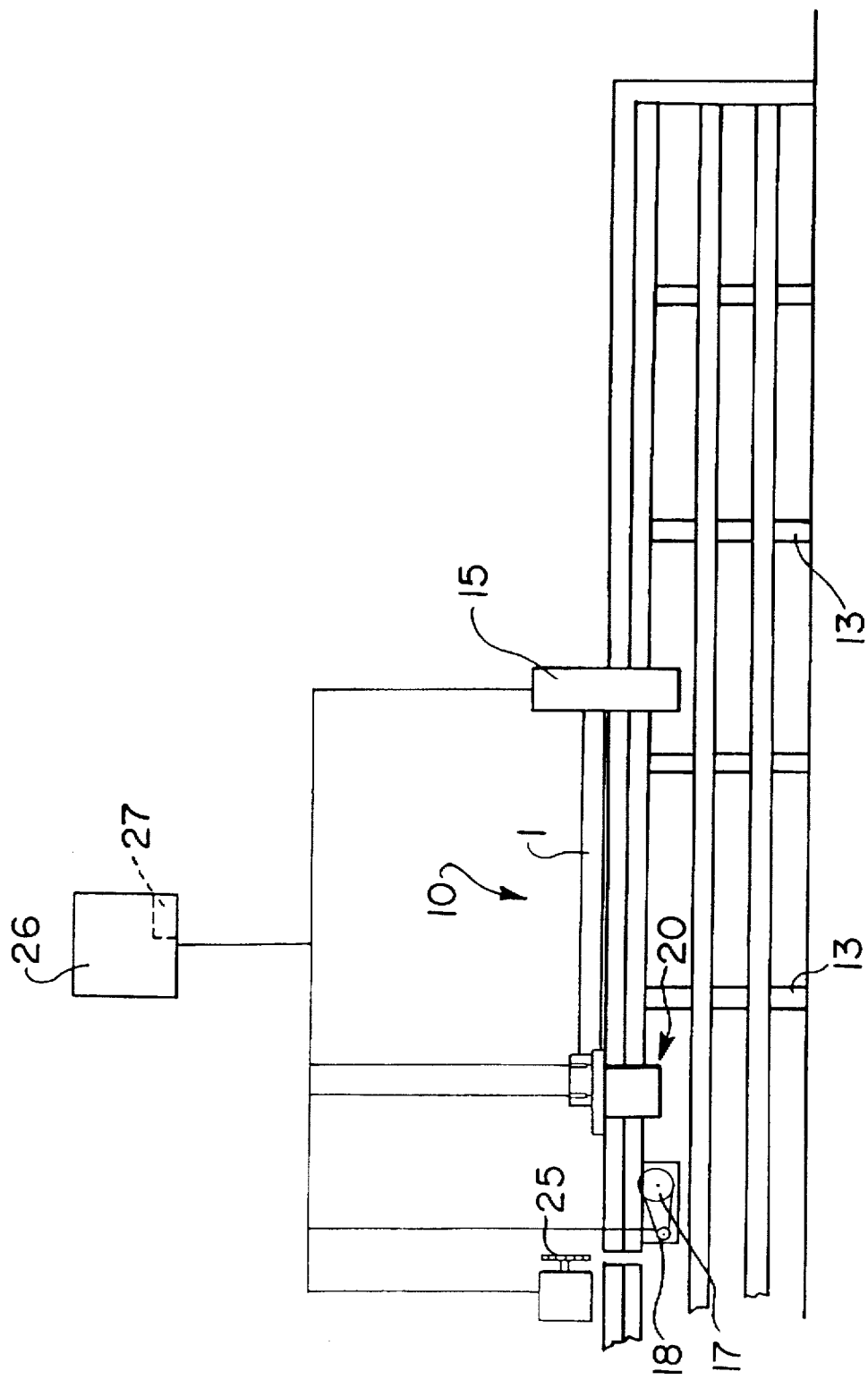

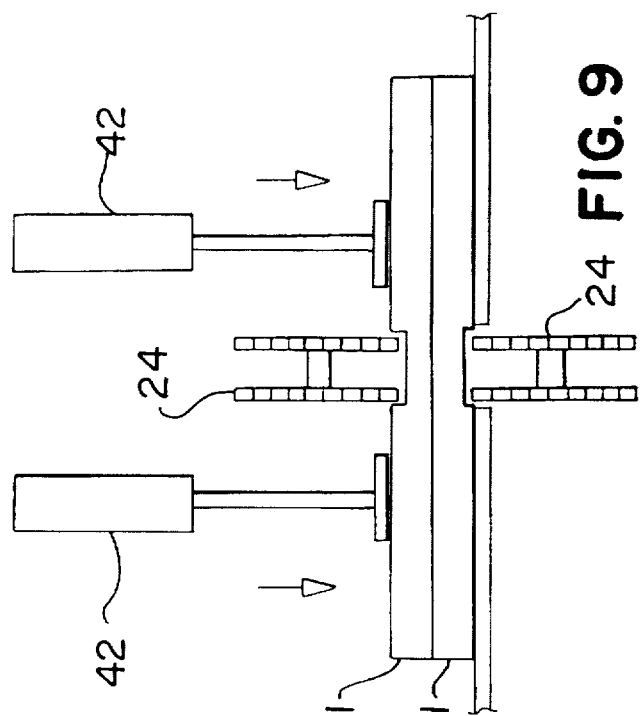
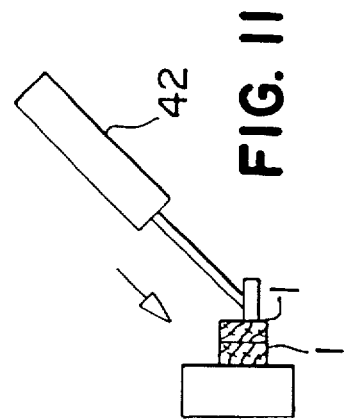
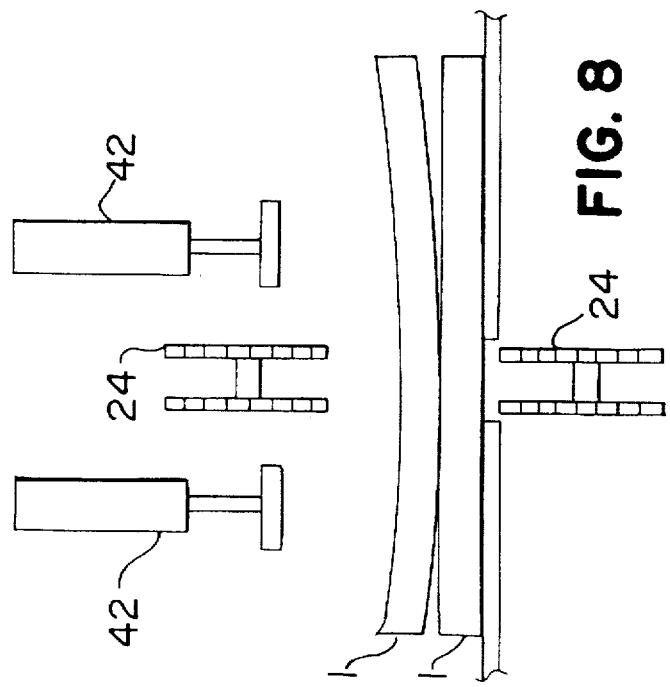
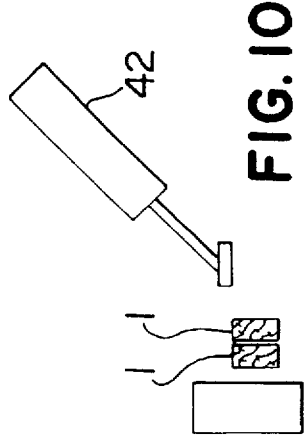

ARRANGEMENT FOR THE CONTROLLED NOTCHING AND CUTTING OF FRAMING COMPONENTS

CROSS REFERENCE TO RELATED APPLICATIONS (Not applicable)

STATEMENT REGARDING FEDERALLY SPONSORED RESEARCH OR DEVELOPMENT (Not applicable)

REFERENCE TO A MICROFICHE APPENDIX SPECIFYING THE TOTAL NUMBER OF MICROFICHE AND TOTAL NUMBER OF FRAMES (Not applicable)

BACKGROUND OF THE INVENTION

The present invention relates to controlled notching and cutting of wood framing components and, in particular, to a computer-driven arrangement for the controlled notching and cutting of wood framing components, such as studs, wall plates and the like.

Light framing (commonly referred to as "stick framing") is a common method for the construction of buildings having up to four stories. Stick framing is performed by the on-site, hand-assembly of the components performed by experienced carpenters using raw materials of random dimensions. The placement of the sticks in the building is determined by a set of construction documents called blueprints. Blueprints become a template for the placement of all building materials. A blueprint is used to draw lines around the foundation where each wall is to be placed. Wall plates (lengths of construction material such as wood, plastic, aluminum or steel used in framing the ceiling and floor of each room) are then measured and cut to fit each line. Components such as doors and windows are laid out on each plate, and reinforcing studs are placed (typically being 16 inches on center) between the walls, doors and windows. The studs and other components are then nailed between the plates and the wall is erected.

Panel manufacturing is another method which generally follows the above-described procedure. However, panel manufacturing is likely to be performed in a controlled environment, and it is often software assisted. For example, blue prints are copied or recreated on a panel software system. Component locations, studs, bearing points and other design considerations are then input by the computer operator. Shop drawings of each wall panel may then be produced. The shop drawings specify the dimensions and locations of each component of the wall panel. This information is transferred by hand, using a tape measure, onto the wall plate. The plate is measured and cut by hand. The pre-cut plates are then sent to an assembly table, where assemblers place the studs and components on the marks made at the layout stage and nail them in place.

While stick framing and panel manufacturing methods are useful for their purposes, these two methods, nonetheless, suffer from several drawbacks. First, mistakes may easily be made by the layout man when reading and transferring the information from the shop drawing to the plate. Second, mistakes may easily be made by either misreading the tape or mis-cutting the line as the plate is cut to length. Third, mistakes may be made at the assembly point by misunderstanding the layout code or missing the mark when nailing. Fourth, in the use of wood studs, moisture causes the wood studs and components to twist within the wall after being nailed. This twisting cause nail pops in sheet rock and visible imperfections in wall finish, and results in substantial replacement costs.

Thus, there clearly remains a need for an arrangement which permits the controlled placement, notching and cutting of components, such as studs, wall plates, shelving, lattices and furniture while minimizing potential mistakes and inaccuracies, and which minimizes warping and twisting of the studs and other components after construction. The notched joint fixes the axial movement of the members in the system and improves engineering design values.

SUMMARY OF THE INVENTION

A primary object of the present invention is to provide an arrangement that can accurately control the notching and cutting of components, such as studs, wall plates, openings, tees and corners.

Another primary object of the present invention is to provide an arrangement that can accurately control the placement of the notched and cut components.

Still another primary object of the present invention is to provide an arrangement that minimizes the twisting that the studs and the components may undergo after being placed in the wall panel.

A further primary object of the present invention is to accelerate production levels by providing a computer-controlled arrangement that lays out, notches and cuts to length each component with minimal set-up time, even when the layout, notch locations and wall length vary infinitely and batch runs are not always practical.

In accordance with the teachings of the present invention there is disclosed herein a computerized controlled apparatus for notching of components. The apparatus includes a support means for supporting the components. A notcher is carried by the support means for notching of the components while being in operational contact with the components. A traveling means is carried by the support means for advancing the components into operational contact with the notcher and away from the notcher. A cut-off saw is carried by the support means for cutting the components to a required length. A controlling means is provided for coordinating and controlling operation of the apparatus. The controlling means produces commands for the notcher, the traveling means, and the cut-off saw according to design considerations received by the controlling means, thereby avoiding participation by an operator and thereby providing a precise implementation of the design considerations.

A marking means is provided for marking each component with an appropriate code to facilitate assembling the components in a predetermined order according to the code marked thereon.

Optionally, a feeding means is located at an entrance of the apparatus. A plurality of components are disposed in the feeding means by the operator, and the feeding means supplies a pair of the components side-by-side to the support means. Also, an exit means is provided for ejecting the components after notching.

Viewed in another aspect, a method for computer controlled notching of components is disclosed. An apparatus is provided including: a support means for supporting the components, a notcher carried by the support means for notching of the components while being in operational contact therewith, a traveling means carried by the support means for advancing the components into operational contact with the notcher and away from the notcher, a cut-off saw carried by the support means for cutting the components to a required length, and a controlling means for coordinating and controlling operation of the apparatus. A pair of identical components are supplied to the apparatus. Information is provided to the controlling means on design considerations and activating the controlling means, thereby allowing the controlling means to produce commands for the notcher, the traveling means, and the cut-off saw according to design considerations received by the controlling means. In this manner, the traveling means advances the pair of identical components into operational contact with the notcher. The controlling means activates a pressure means to apply pressure to the components to ensure contact therebetween. The controlling means activates the notcher for notching both components simultaneously and stops notching when the notching has been completed. The traveling means advances the pair of the components to a finishing position in operational contact with the cut-off saw. The controlling means activates the cut-off saw such that the components are cut at the required length. The sequence of steps is repeated.

Viewed from a further aspect, a notched component is produced by a computer controlled apparatus with no operator participation. A pair of side-by-side components is supplied to the computer controlled apparatus comprising a support means for supporting said pair of components, a notcher, a traveling means and a cut-off saw, all carried by the support means, and a controlling means for coordinating and controlling operation of the apparatus. The controlling means is provided with information on optimal positioning and dimensions of notching. The controlling means generates operational commands for the notcher, the traveling means, and the cut-off saw, in accordance with said information. The traveling means advances the pair of said components into operational contact with the notcher, and the notcher is then activated to notch both components simultaneously. A depth of the notches is controlled, and a pressure is applied against the components prior to activation of the notcher to ensure alignment of notches on each of said pair of the components. The notcher is deactivated upon completing the notching and the traveling means advances the components to a finishing position in operational contact with the cut-off saw. The cut-off saw is activated to cut-off the components at a required length.

These and other objects of the present invention will become readily apparent from a reading of the following description and claims, taken in conjunction with the enclosed drawings.

BRIEF DESCRIPTION OF THE DRAWINGS

FIG. 4 is a diagrammatic side view of the arrangement of FIG. 3 illustrating the advancement of the traveling means (means for advancing the clamped wall plates) as it moves the wall plates into the notcher.

FIG. 8 is a top view showing the wall plates in the present invention prior to contact with the wedging means and the dado-cut saws.

FIG. 9 is a top view showing the wedging means against the wall plates and the dado-cut saws notching the wall plates.

FIG. 10 is a side view of FIG. 8 showing the wedging means and the wall plates.

FIG. 11 is a side view of FIG. 9 showing the wedging means engaging the wall plates.

DESCRIPTION OF THE PREFERRED EMBODIMENTS

Figure 1:
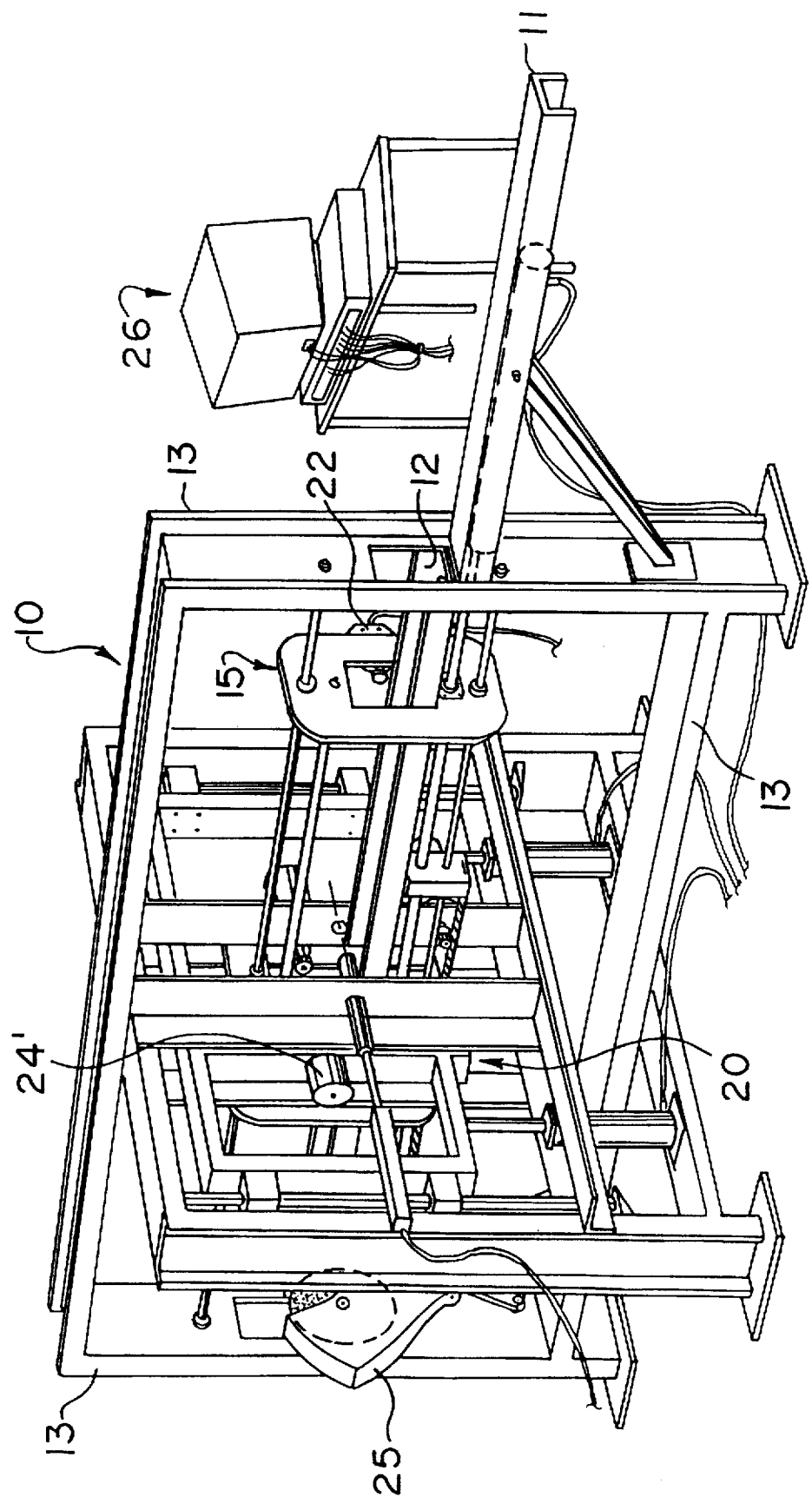
FIG. 1 is a perspective view of the arrangement of the present invention.

Referring now to the drawings, and in particular to FIGS. 1-4, the arrangement or apparatus of the present invention will now be discussed. The arrangement or apparatus provides for the controlled notching and cutting of components 1, such as studs, wall plates, shelving, lattices and furniture. In this respect, the arrangement or apparatus cuts to length components 1 such as the horizontal base plate 1 and parallel top plate 1 of a frame for a wall, while simultaneously making transverse notches therein.

The arrangement or apparatus 10 includes a support means 11 for supporting the framing components to be notched and/or cut. The support means 11 includes a plurality of guide rails 12 that are supported by a frame 13.

A plurality of spaced-apart roller means 14 are disposed transversely between the guide rails 12. The components 1 are supported on the roller means 14 and the components 1 are easily moved from the entry to the exit of the apparatus.

All of the guide rails 12 are substantially horizontal and substantially parallel to one another.

The frame 13 is a standard frame, well known to those skilled in the art, and includes support legs that rest upon a floor or foundation for supporting the arrangement 10.

A traveling means 15 is carried by the support means 11 near one end thereof, and is capable of horizontal movement in either direction along the length of support means 11.

The traveling means 15 has an opening formed therethrough and the components 1 are disposed longitudinally through the opening. A gripping means 22 is mounted thereon to grip the components 1 such that the components 1 move concurrently with the traveling means 15. The gripping means 22 preferably is a pair of movable pins disposed on a face of the traveling means 15 opposing one another. In this manner, the pins may be moved pneumatically, hydraulically or electrically toward one another to engage the components 1 therebetween and secure the components 1 to the traveling means 15. It is further preferred that a second pair of gripping means 22 be mounted on the opposite face of the traveling means 15 to better enable the components to be centered.

The traveling means 15 advances the gripped base plate 1 and top plate 1 through a powered notching station 20 in a step-wise or continuous manner. Movement of the traveling means 15 is provided by a belt 16 connected thereto, the belt 16 being driven by drive wheel 17 connected to a stepper/drive motor 18. It is preferred that the drive wheel 17 have a plurality of teeth formed on the outer circumference thereof (a sprocket). A continuous toothed belt 19 engages the teeth on the drive wheel 17 and also engages a toothed axle on the stepper/drive motor 18, the axle having a smaller circumference than the drive wheel 17. In this manner, a small rotation in the axle of the stepper/drive motor 18 is transformed into a larger rotation of the drive wheel 17 and thus, increased control over movement of the traveling means 15 is obtained. The stepper/drive motor 18 is reversible. In this fashion, the traveling means 15 is selectively stepped/driven to advance in a first direction along support means 11, or to retract, reciprocally, in a second opposite direction.

The traveling means 15 moves in the first direction along support means 11, and pushes the components into operational contact with the notching station 20.

Notching station (or notcher) 20 is carried by the support means 11 near an end opposite that of traveling means 15. The notcher (notching station) 20 is provided for selectively notching the framing components that are brought into contact therewith.

As can be best seen in FIGS. 2 and 5–11, the notcher (notching station) 20 includes a notching means carriage 21. The notching means carriage 21 carries powered notching means for making transverse notches preferably in the wider (4 in.) face of the 2×4 wall plates of the frame, as will be discussed at length below. Also included in the notcher 20 is a wedging means 42.

The notcher 20 further preferably includes at least one, and in the case of a double-sided notcher, two dado-cut saws (powered notching means) 24. The dado-cut saws 24 which preferably are a plurality of ganged saws, are carried by the notching means carriage 21 for selective substantially horizontal movement thereof. Such movement is provided by means for moving (advancing and retracting) the powered notching means vertically into engagement with the gripped wall plates 1.

In a preferred embodiment (FIGS. 5–11), each notching means carriage 21 is pivotally mounted on the frame 13. Each notching means carriage 21 has a dado-cut saw 24 carried thereon such that each saw blade is substantially perpendicular to the longitudinal axis of the respective components 1. As the notching means carriage 21 is pivoted toward the wall plates 1 and moved downwardly, the dado-cut saw 24 engages the respective wall plate 1 and begins cutting the notch 23 at the upper edge of the wall plate. As the notching means carriage 21 completes the vertical movement, the dado-cut saw 24 is pivoted through a small arc to move the dado-cut saw 24 away from the wall plate and to provide a notch 23 of a constant depth in the wall plate 1. The dado-cut saw 24 is moved vertically in a first direction and then in an opposite second direction to notch spaced-apart notches 23 in the wall plates. Vertical pivotal movement of the notching means carriage 21 is preferably activated pneumatically, hydraulically or electrically. The controller means 26 activates each dado-cut saw 24 independently and also controls the pivotal motion of each notching means carriage 21 independently by providing individual commands to the carriages 21 and the saws 24. In this manner, the engagement of each dado-cut saw 24 can be controlled to determine the depth of the notch 23 formed in each component 1. Although in most instances, the notches 23 in both components 1 are of identical depth, the apparatus has the capability to produce a notch having a desired depth which may be different in each component 1. The notch 23 may be of a different depth at a first location compared to a second location on the same component 1. It is preferred that each dado-cut saw 24 be shielded for safety purposes.

Alternately, (FIG. 1) the notching means could be at least one, and in the case of a double-sided notcher, two routers 24'. The routers 24' are carried by the notching means carriage 21 for the selective vertical movement. Means are provided to move the routers 24' downwardly and upwardly into engagement with the gripped wall plates 1.

Preferably, notcher 20 is capable of double-sided notching, in which case a dado-cut saw 24 or a router 24' is located on each side of the gripped base plate 1 and top plate 1, so as to straddle the plates. The dado-cut saws 24 are horizontally movable to intercept the framing components as the dado-cut saws 24 are moved, preferably conjointly, toward one another. The routers 24' may be vertically moved for making the transverse notches in the framing components, so that the notches 23 are parallel and aligned with each other. If desired, the notches 20 can be controlled so as to notch one of the framing components independently of the other component.

Preferably, the notches 23 are in the form of a dado having parallel sides. The notch 23 may be of any desired depth. A depth of approximately ⅛ inch has been found to be effective to secure the vertical stud in the plates. The alignment provided by this arrangement assures that a vertical stud will fit properly between the base plate and the top plate.

Figure 13:
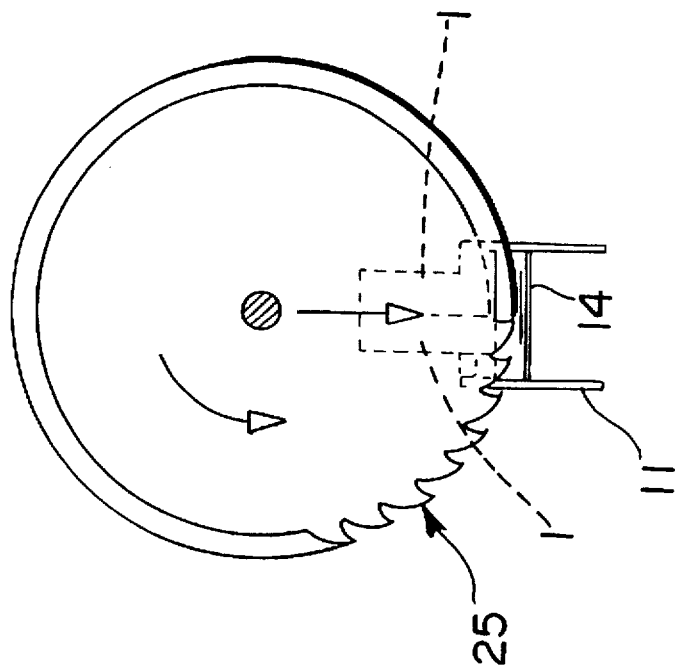
FIGS. 12 and 13 are side views, enlarged for the sake of clarity, of the cut-off saw (cut-off means) of FIGS. 1-4, which is used for the controlled cutting of the notched wall plates.
Figure 12:
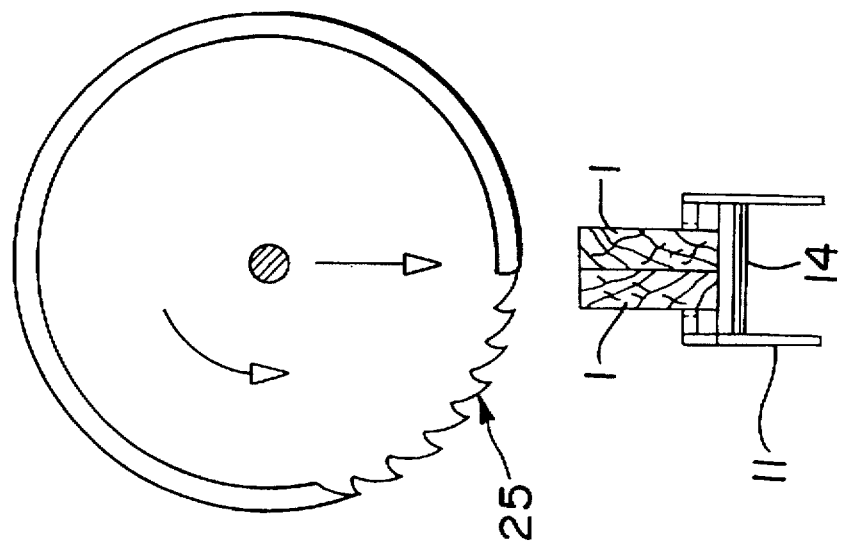
Figure 14:
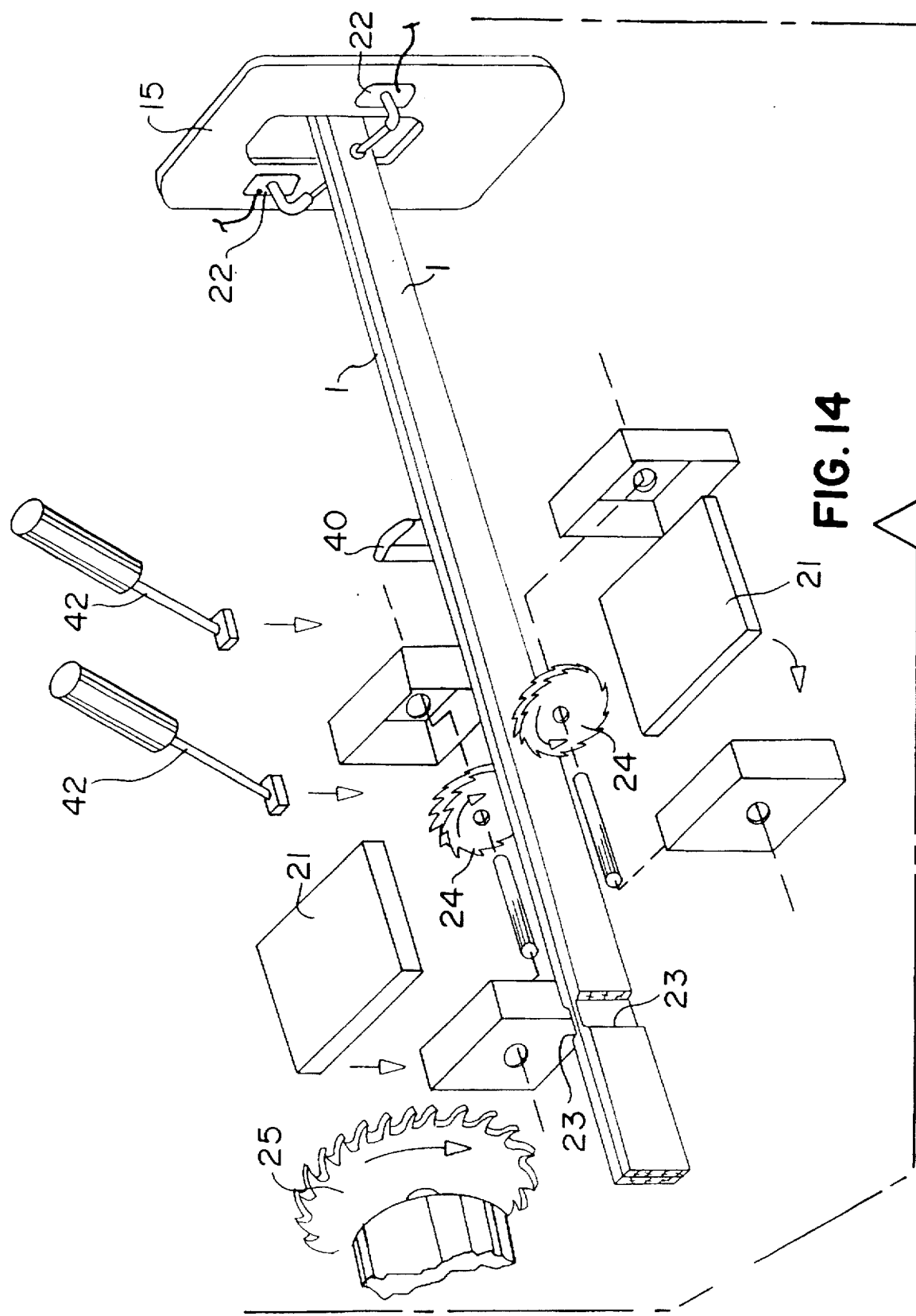
FIG. 14 is an exploded perspective view of the traveling means, the wedging means, the traveling means and the cut-off means.

A cutoff saw (cut-off means) 25 is carried by the support means 11 such that the notcher 20 is positioned between the cutoff saw 25 and the traveling means 15. The cutoff saw 25 is provided for selectively cutting the framing components to a desired length subsequent to the notching operation. During further advancement of the traveling means 15, the components are pushed past the notcher 20 and into operational contact with the cutoff saw 25 (FIGS. 12–13).

Preferably, the cutoff saw is a rotary saw.

Finally, a controller means 26 is provided for coordinating and controlling the operation and movement of the traveling means 15, the notcher 20 and the cutoff saw 25. In this manner, controlled notching and cutting of the framing components, such as studs, wall plates, shelving, lattices and furniture is provided. Preferably, the controlling means 26 is programmable for variable control of the step-wise advancement of the gripped components into the notcher 20, the subsequent movement of the wedging means 42 and the powered notching means, and the operation of cut-off means 25. Such a means may include a microcomputer 26 with software 27 operationally connected to the traveling means 15, notcher 20, saw 25 and other controlled components by electrical cables in a suitable manner known to those skilled in the art.

Computer 26 receives therein the user's input concerning the dimensions and positioning of the wall panels, studs, etc.

that are to form part of the framing. The input may be introduced by an operator, from a diskette, from a sender through a communication network, or by other means known to persons skilled in the art. The computer 26 then controls the operation of the arrangement 10 in accordance with the user's input.

Referring now to FIGS. 1–14, the operations of the arrangement will now be discussed for the preparation of a wall plate. The operation is similar for other components for other applications and the following is provided as a typical example and not as a limitation.

Figure 17:
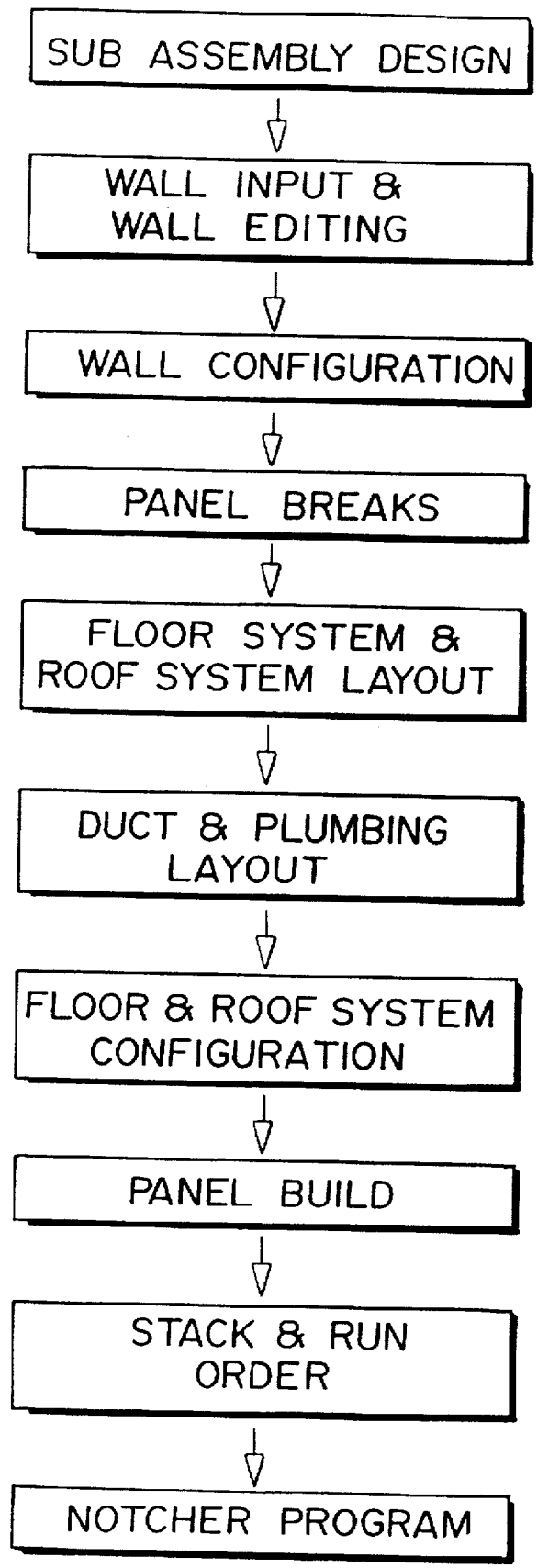
FIG. 17 is a diagram showing the software of the present invention.

A flowchart (FIG. 17) shows a typical use for the preparation of wall panels. Based on architectural and structural plans, diagrams of rooms or series of rooms and data entered into the computer 26, the program designs door and window openings, tees, corners, electrical fixtures, etc. and enters the information into a library. The length, width and location of all walls is defined. The computer 26 designs wall heights, stud spacing, material, grades and sheathing locations. The length of walls are designed to panel lengths which are manageable by workers at an assembly site. The floor and roof system layout is designed using a "template" of an existing wall layout. Duct and plumbing locations which are unchangeable due to weight and/or heat and air control, are entered as constants. The computer 26 considers these factors as interference issues with respect to the floor system. The computer 26 then defines truss direction, spacing, depth, loading, etc. Using a subassembly library, the computer 26 automatically prepares a layout of walls and trusses to place all individual pieces in each wall panel. Studs are placed under the beam and truss system. The parts placement listing for each panel is recorded in a file for subsequent determination of commands for the notcher 20. The computer 26 defines the order in which the panels are to be notched and stacked. The computer 26 then controls all robotic movement to notch the components, cut the components to the required length, mark subassembly locations, panel numbers, truss system component locations and wall intersection locations. In this manner, panels can be assembled either at the site of the apparatus 10 disclosed herein or at a remote site using the markings on the components. Component markings are provided for assembly of a full architectural plan or layout. All of this information is recorded and written in a diskette. The diskette is transferred to the shop computer 26 which controls the operation of the arrangement 10.

Figure 2:
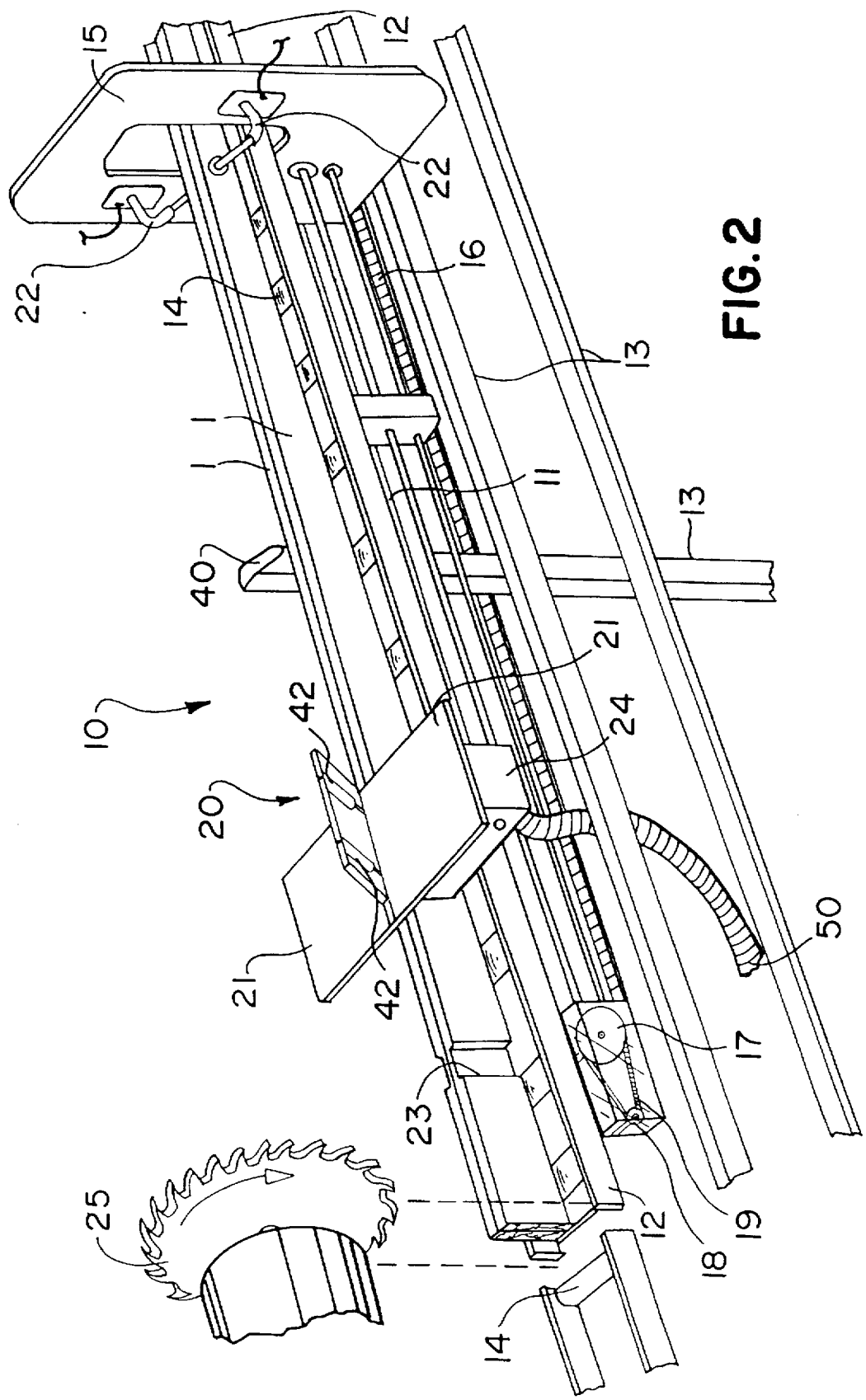
FIG. 2 is a perspective view of the arrangement of the present invention illustrating partially finished top and base wall plates clamped within the arrangement.
Figure 3:
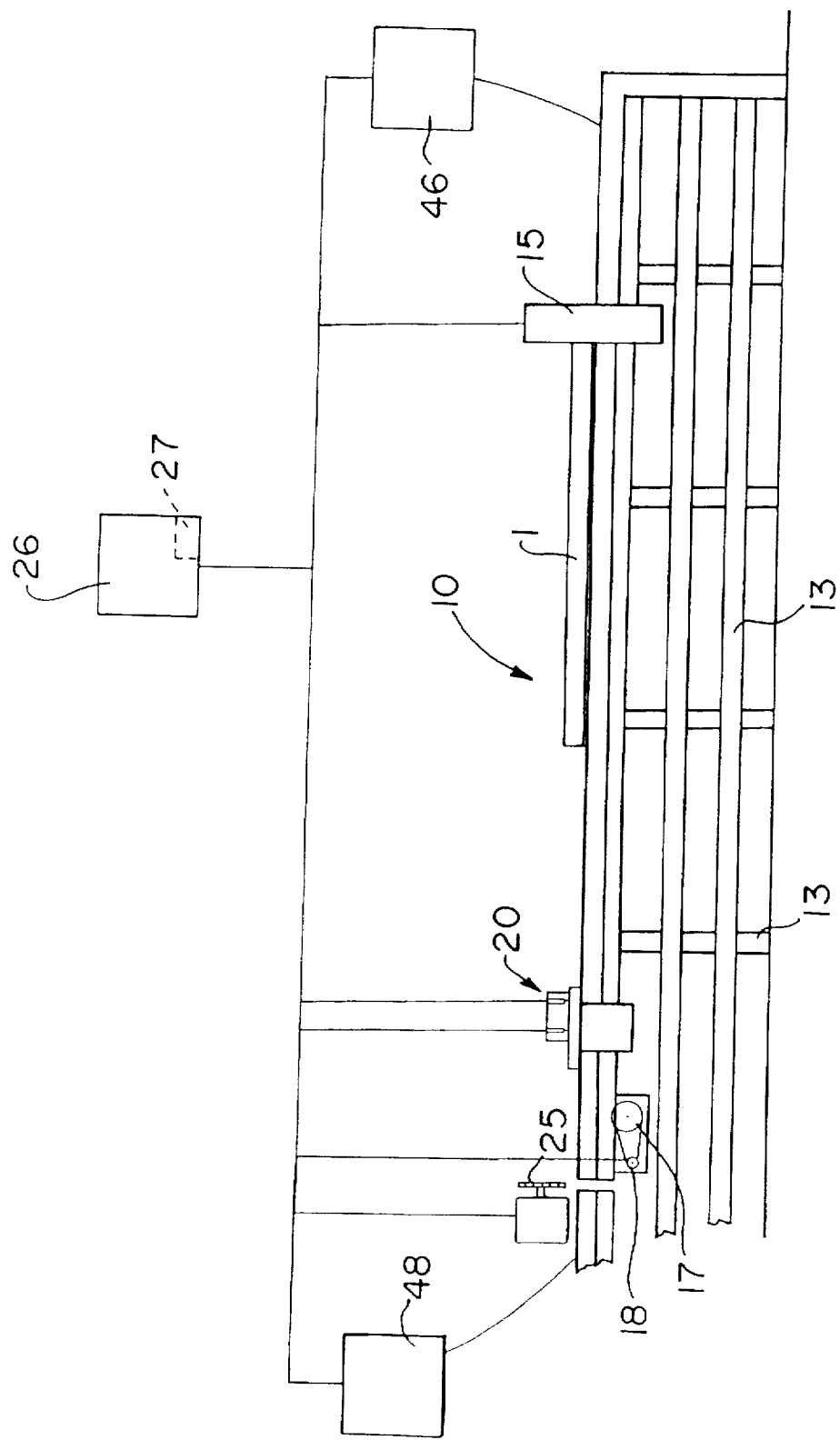
FIG. 3 is a diagrammatic side view of the arrangement of the present invention illustrating the initial position of the clamped wall plates to be notched and cut.
Figure 6:
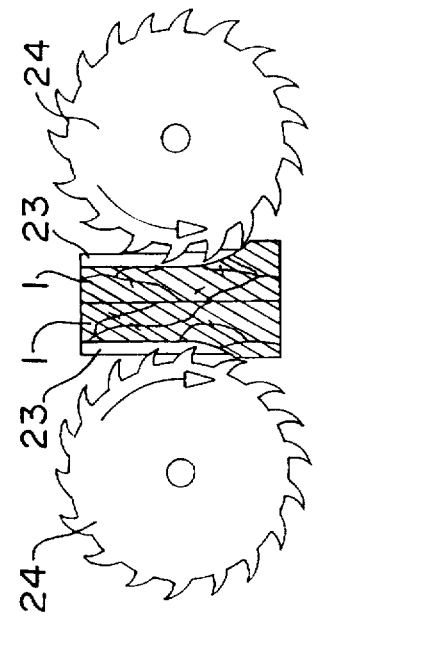
FIG. 6 is a side view showing the dado-cut saws notching the wall plates.
Figure 5:
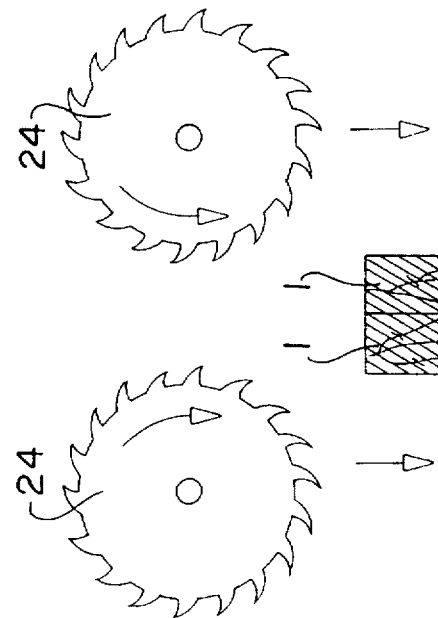
FIG. 5 is a side view of the dado-cut saws being moved downwardly to notch the wall plates.
Figure 7:
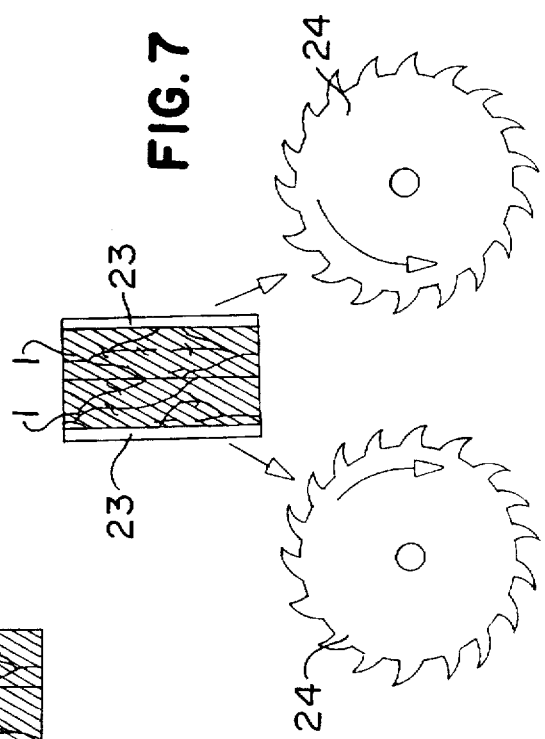
FIG. 7 is a side view showing the dado-cut saws moving downwardly and outwardly following notching of the wall plates.

As shown in FIGS. 2 and 3, wall plates 1 (a horizontal bottom wall plate and a top wall plate that is to be parallel thereto) are placed on the guide rails 12 and gripped within the traveling means 15 by gripping means 22. It is preferred that a computer-controlled apparatus 46 be provided to load the wall plates 1 on the machine table without any intervention by the operator. For the purpose, of example only, the base plate 1 and the top plate 1 (as well as the stud that is to be located therebetween) are wood 2×4's, and the notches are to be cut along the width of the respective 2×4's.

As shown in FIGS. 3 and 4, the computer 26 activates the stepper/drive motor 18 to move the traveling means 15 in the first direction until the traveling means 15 contacts and engages the wall plates 1, and pushes (moves or advances) the plates 1 into the notching station 20.

Preferably, a marking means 40 marks the base plate 1 and the top plate 1 to encode each plate with specific information to permit a person subsequently assembling the wall plates 1 and the studs, to properly orient each wall plate with respect to the overall layout designed by the computer.

The marking means also transfers additional information unrelated to the attachment of structural members but relates to the placement with respect to other building materials and elements within the structure.

At least one, and preferably two, wedging means 42 are mounted on the frame 13. The wedging means 42 are activated by the computer 26 and apply up to 500 psi pressure against the clamped wall plates 1 to reduce distortion in the plates before notching.

In a preferred embodiment, the wedging means 42 has a substantially rectangular block disposed immediately adjacent to the teeth of the dado-cut saw 24. The block is attached to a piston which is received in a cylinder. The piston is moved into and out of the cylinder as controlled by the computer 26 to move the wedge into contact or out of contact with the wood components 1. Hydraulic, pneumatic or electrical power may be used to power movement of the piston. The piston/cylinder may be perpendicular to the wood components or may be at an angle, as long as movement of the block is produced to wedge the plate 1 firmly. The drive motor 17 is then stopped, and the double-sided notcher cycles and both dado-cut saws 24 are advanced inwardly and downwardly into contact with the wall plates 1, so that a first pair of the desired notches are cut transversely in the wood plates 1 to a desired depth. The notches are parallel and aligned with each other. The dado-cut saws 24 on both sides are retracted from contact with the wall plates 1. A flexible tube 50 is connected to the notcher 20 to collect shavings and dust generated during the notching procedure and to carry the waste away from the work area.

The stepper/drive motor 18 is then reactivated and the traveling means 15 incrementally advances the wall plates 1 by a predetermined length into a second desired position on the plates 1.

A second double-sided notching operation then takes place in which the dado-cut saws 24 are advanced inwardly and upwardly into engagement with the clamped plates 1, thereby forming a second pair of aligned notches 23 in the wall plates 1 spaced apart from the first pair of aligned notches 23.

The stepper/drive motor 18 may then be reactivated to move the wall plates 1, as desired, and the above-described process may be repeated as many times as desired for forming a plurality of pairs of spaced-apart transverse notches 23 along the length of the top and base plates 1. In this manner, the notching operation takes the form of a square wave with the dado-cut saws 24 moving sequentially inwardly, downwardly, outwardly, inwardly, upwardly and outwardly. The arrangement insures that the respective pairs of notches 23 formed in the plates 1 will be properly aligned, and that a vertical stud will fit snugly between the two plates.

When all desired notches 23 have been cut, the stepper/drive motor 18 is reactivated, so as to further advance the plates 1 past the notcher 20 and into operational contact with the cutoff saw 25. Once in position, the computer 26 stops the operation of the traveling means 15, and the cut off saw 25 is activated to selectively cut the wall plates. In a preferred embodiment, the computer 26 controls an automated device to remove the finished plates 1.

The computer 26 repeats the above-described process as many times as necessary for notching and cutting the requisite number of wall plates. The spacing between the notches 23 and the length of each pair of wall plates 1 is determined by the computer program.

A quality control feature of the system is a plurality of sensors 44 mounted on the traveling means 15, the dado-cut saws 24, the cut-off saw 25, the marking means 40, the wedging means 42 and other critical portions of the device. Each sensor provides feedback to the computer 26 to ensure each step is occurring in the proper sequence and that each component has been activated/deactivated as needed.

It is also preferred that means 48 be provided to remove or unload the notched components 1 from the frame 11 after the cut-off saw 25 has cut the components 1 to the desired length. The controller means 26 provides the commands to the unloader means 48 at the proper time to remove the notched components 1.

In this manner, the entire sequence of operations from the loading of the components 1 onto the apparatus through the notching and the removal of the notched components 1, is controlled by the controller means 26 without participation or intervention of a human operator.

Figure 15:
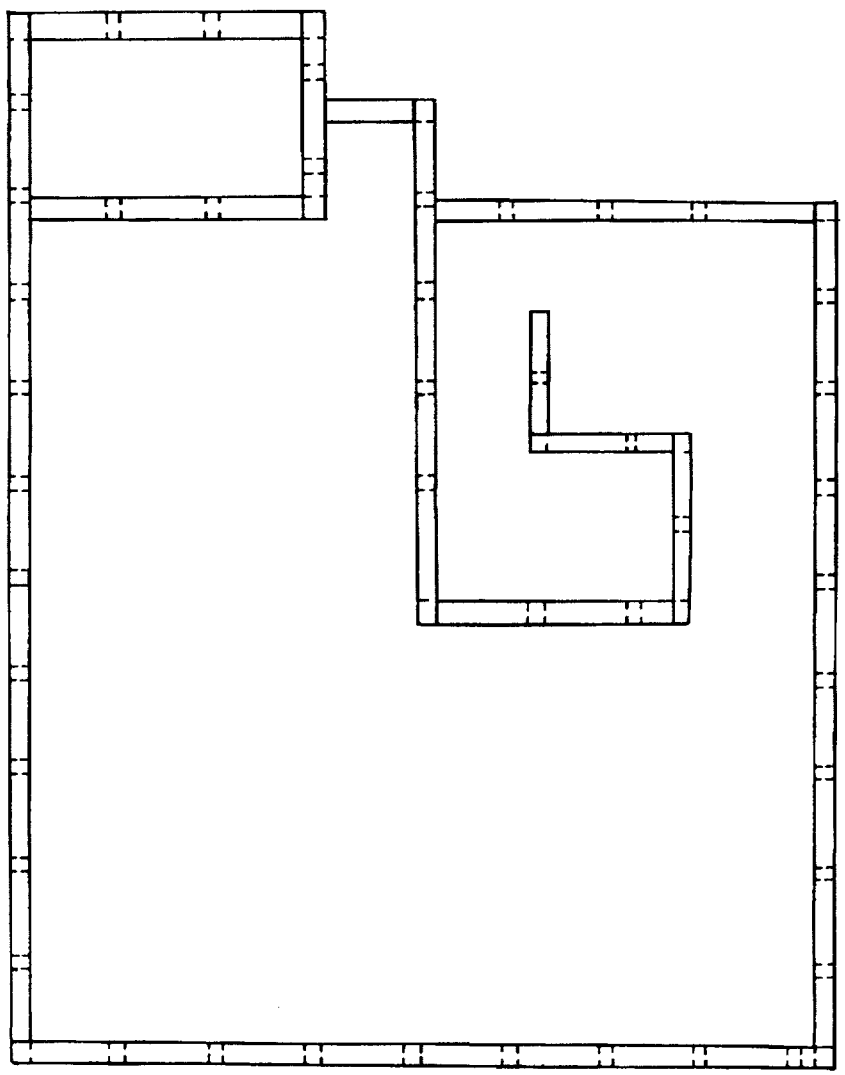
FIG. 15 is a plan view indicating lengths of the various wall plates and the relative positions of the notches formed therein.

FIG. 15 shows a floor plan which is exemplary of the number and placement of the notched studs which form the wall panels on one story of a typical building.

Figure 16:
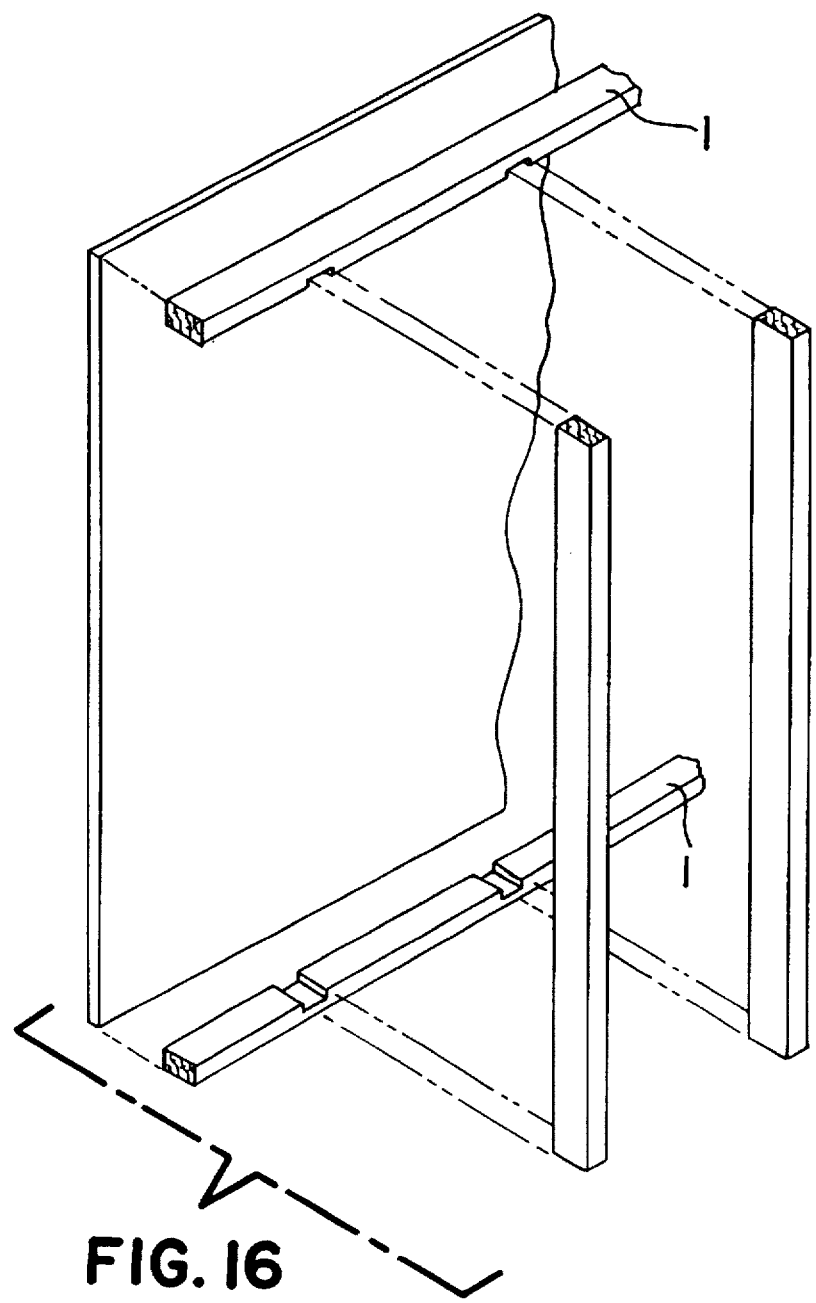
FIG. 16 is an assembly diagram of a wall frame manufactured in accordance with the following invention.

Once selectively notched and cut in the manner described above, the finished plates may be removed from the arrangement 10 and placed on an assembly table. As illustrated in the assembly diagram of FIG. 16, the studs and the components may be pieced together and fastened in place by, for example, nailing.

Another embodiment of the present invention is a portable arrangement which can be moved to a job site and set up in the immediate vicinity of the construction to reduce transportation and material costs and to expedite construction. The portable arrangement has the same fundamental components as the arrangement described above and is operated in the same manner.

Because the arrangement of the present invention guarantees that the notches 23 formed in the parallel wall plates 1 are aligned, it assures the proper positioning of the studs in the frame and precludes subsequent misalignment of the studs due to warping or the like.

The arrangement 10 described above is also useful for producing sole plates members having shallow recesses or rabbets formed therein for locating and receiving the lower ends of studding.

With this device, there is no human intervention throughout the layout or dimensioning process, and assemblers are compelled to place the studding properly in the notches. The aligned notches prevent the material from twisting after manufacturing. Structural advantages are also provided by the notches because they stabilize the walls and improve design values. However, if desired, the arrangement may be manually controlled to position the plates, activate the notcher and cut the plates.

Moreover, there are indirect advantages in constructing wall plates in accordance with the present invention before shipment to the job site. This allows debugging of the plans on the computer. A larger volume of business can be completed in a relatively small space. Freight dollars are saved by not shipping defective components and by having no excess material in the shipment since all components are precut to the required dimensions.

Additional savings in shipping costs can be obtained by shipment of the unassembled wall plates which have been appropriately marked by the marking means 40. All of the intervening space in the framed unit is saved and shipping costs are significantly reduced. However, when the wall plates are received on site, the consumer must provide studs cut to proper lengths and must assemble the wall plates and studs as directed by the markings on the wall plates 1 and the layout.

Although the examples are directed to wall plates and components for architectural plans, the device is also useful with any members which require notching in a controlled and production environment. Shelving, furniture and containers are other end products which are amenable to use of the present device.

It will be readily appreciated by those skilled in the art, that the apparatus of the present invention may find application for shaping and surface treatment especially of any wood components. For this purpose, the notchers should be replaced by an appropriate means, for instance, abrasive wheels, shaping means, etc.

Obviously, many modifications may be made without departing from the spirit of the present invention. Accordingly, it will be appreciated by those skilled in the art that within the scope of the appended claims, the invention may be practiced other than has been specifically described herein.

What is claimed is:

1. A computerized controlled apparatus for notching of components, comprising:
   a support means for supporting the components,
   a notcher carried by the support means for notching of the components while being in operational contact therewith,
   a traveling means carried by the support means for advancing the components into operational contact with the notcher and away from the notcher,
   a cut-off saw carried by the support means for cutting the components to a required length, and
   a controlling means for coordinating and controlling operation of the apparatus, wherein the controlling means produces commands for the notcher, the traveling means, and the cut-off saw according to design considerations received by the controlling means, thereby avoiding participation by an operator and thereby providing a precise implementation of the design considerations.

2. The apparatus of claim 1, wherein the components include a pair of identical components brought into contact therewith.

3. The apparatus of claim 2, wherein the notcher is a double-sided notcher, wherein the traveling means moves the pair of identical components into operational contact with the double-sided notcher for notching both components simultaneously.

4. The apparatus of claim 2, wherein the notcher is a double-sided notcher, wherein the traveling means moves at least one of the pair of identical components into operational contact the notcher for notching at least one of the components independently of the other component.

5. The apparatus of claim 2, further including a wedging means for securing the components in contact with each other during the notching, the wedging means being activated by the controlling means to apply a pressure against the components.

6. The apparatus of claim 1, wherein the notcher includes first and second dado-cut saws secured to the support means by a first and a second carriage, respectively, the controlling means commanding movement of said first and second carriages in respect to the components, thereby controlling depth of notching, and wherein the controlling means controls each of said first and second dado-cut saws individually.

7. The apparatus of claim 1, wherein the notcher is moved in a first direction to produce a first notch in the components and the notcher is moved in a second opposite direction to produce a second spaced apart notch in the components.

8. The apparatus of claim 1, wherein the support means includes a frame having a plurality of guide rails.

9. The apparatus of claim 1, wherein the traveling means has an opening formed therein to receive the components and gripping means connected to the traveling means, the gripping means gripping the components.

10. The apparatus of claim 9, wherein the traveling means advances incrementally.

11. The apparatus of claim 9, wherein the traveling means advances continuously.

12. The apparatus of claim 1, wherein the notcher is positioned between the cut-off saw and the traveling means.

13. The apparatus of claim 1, further including a marking means for marking each component with an appropriate code, and wherein said components are to be assembled in a predetermined order according to the code marked thereon.

14. The apparatus of claim 1, wherein the components are disposed in a structure and have an interrelationship with building materials and elements within said structure, the apparatus further including marking means for marking each component with an appropriate code, said code providing information relating placement of the building materials and elements with respect to said components.

15. The apparatus of claim 1, further including a loading means located at an entrance of the apparatus, wherein a plurality of components are disposed in the loading means by the operator, and wherein the loading means supplies a pair of the components side-by-side to the support means.

16. The apparatus of claim 1, wherein the controlling means includes a computer and further includes means for receiving information on the design considerations.

17. The apparatus of claim 16, wherein the information is input into the computer by the operator.

18. The apparatus of claim 16, wherein the information is input into the computer from a diskette.

19. The apparatus of claim 16, wherein the information is sent to the computer from a sender through a communication network.

20. The apparatus of claim 16, wherein the information on the design considerations includes data on positioning and dimensions of the required notching and cutting of the components.

21. The apparatus of claim 16, wherein the information on the design considerations includes a blueprint, and wherein the controlling means processes the blueprint and generates data for optimal positioning and dimensions of the notching and cutting of the components.

22. A method for computer controlled notching of components, comprising the steps of:

providing:

a support means for supporting the components, a notcher carried by the support means for notching of the components while being in operational contact therewith, a traveling means carried by the support means for advancing the components into operational contact with the notcher and away from the notcher, a cut-off saw carried by the support means for cutting the components to a required length, and a controlling means for coordinating and controlling operation of the apparatus;

supplying a pair of identical components to the apparatus, and providing information to the controlling means, activating the controlling means, the controlling means activating the traveling means and advancing the pair of identical components into operational contact with the notcher, the controlling means activating a pressure means and applying pressure to the components to ensure contact therebetween, the controlling means activating the notcher for notching the components and stopping the notching when the notching has been completed, repeating the sequence of steps to provide a desired quantity of notches, the traveling means advancing the pair of the components to a finishing position in operational contact with the cut-off saw, and the controlling means activating the cut-off saw such that the components are cut at a required length.

23. The method of claim 22, further including the step of providing the notcher with first and second dado-cut saws secured to the support means by a first and a second carriage, respectively, the controlling means commanding moving of said first and second carriages with respect to the components, thereby controlling depth of notching, the controlling means controlling each of said first and second dado-cut saws individually.

24. The method of claim 22, further including the step of moving the notcher in a first direction, producing a first notch in the components, and moving the notcher in a second opposite direction producing a second spaced-apart notch in the components.

25. The method of claim 22, further including the step of marking each component by an appropriate code, and assembling said components in a predetermined order according to the code marked thereon.

26. The method of claim 22, further including the steps of providing a software program to a computer, the computer processing the information on the design consideration and generating a layout including an optimal position and dimension of notching and cutting to be done, and providing said layout to the controlling means.

27. The method of claim 26, including the step of recording the layout on a diskette.

28. The method of claim 26, including the step of sending the layout to the controlling means from a sender through a communication network.

\* \* \* \* \*